United States Patent

[11] 3,620,192

| [72] | Inventors | James R. Taylor<br>R.D. 1, Buffalo Mills, Pa. 15534;<br>Clifford M. Berry, 110 Hillcrest Ave.,<br>Manhasset, N.Y. 11030 |
|---|---|---|
| [21] | Appl. No. | 21,166 |
| [22] | Filed | Mar. 19, 1970 |
| [45] | Patented | Nov. 16, 1971 |

[54] ANIMAL ACTUATED SILO FEEDING GATE
5 Claims, 7 Drawing Figs.

[52] U.S. Cl. .................................................. 119/16,
119/54
[51] Int. Cl. .................................................. A01k 01/00
[50] Field of Search .......................................... 119/16, 22,
51, 54

[56] References Cited
UNITED STATES PATENTS

| 2,294,025 | 8/1942 | Dagg | 119/22 |
| 2,520,555 | 8/1950 | Major | 119/51 |
| 2,551,460 | 5/1951 | Peterson | 119/16 X |
| 2,691,359 | 10/1954 | Anstiss et al | 119/20 |
| 2,843,085 | 7/1958 | McKee | 119/16 |
| 3,063,416 | 11/1962 | Elstner | 119/51 |

Primary Examiner—Aldrich F. Medbery
Attorney—John J. Byrne

ABSTRACT: A feeding silo of the type comprising an enclosure of substantially rectangular configuration having an open end. A feeding gate is positioned across said opening and is mounted for movement longitudinally through said enclosure at a rate dependent upon the rate of consumption of the ensilage within the silo

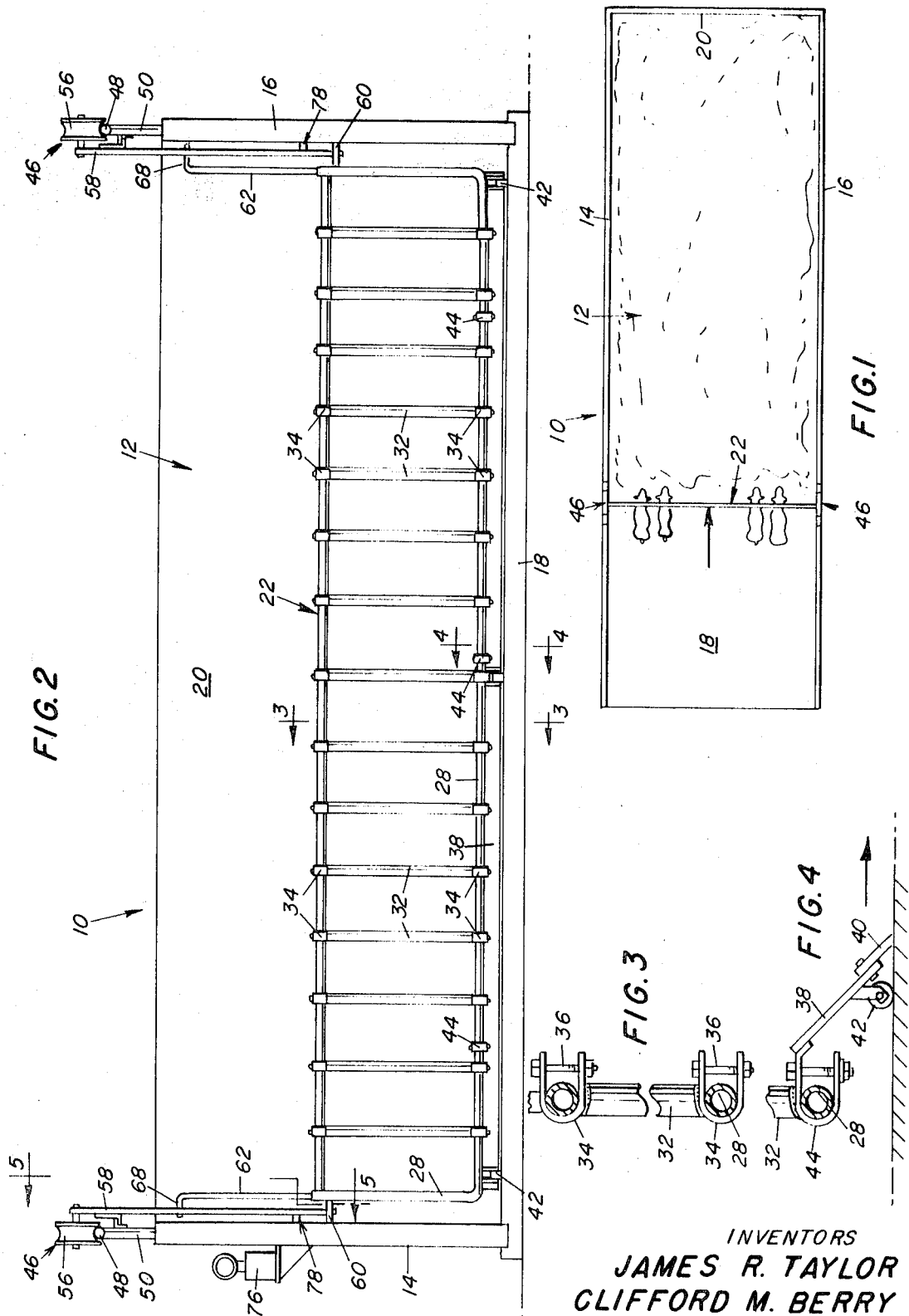

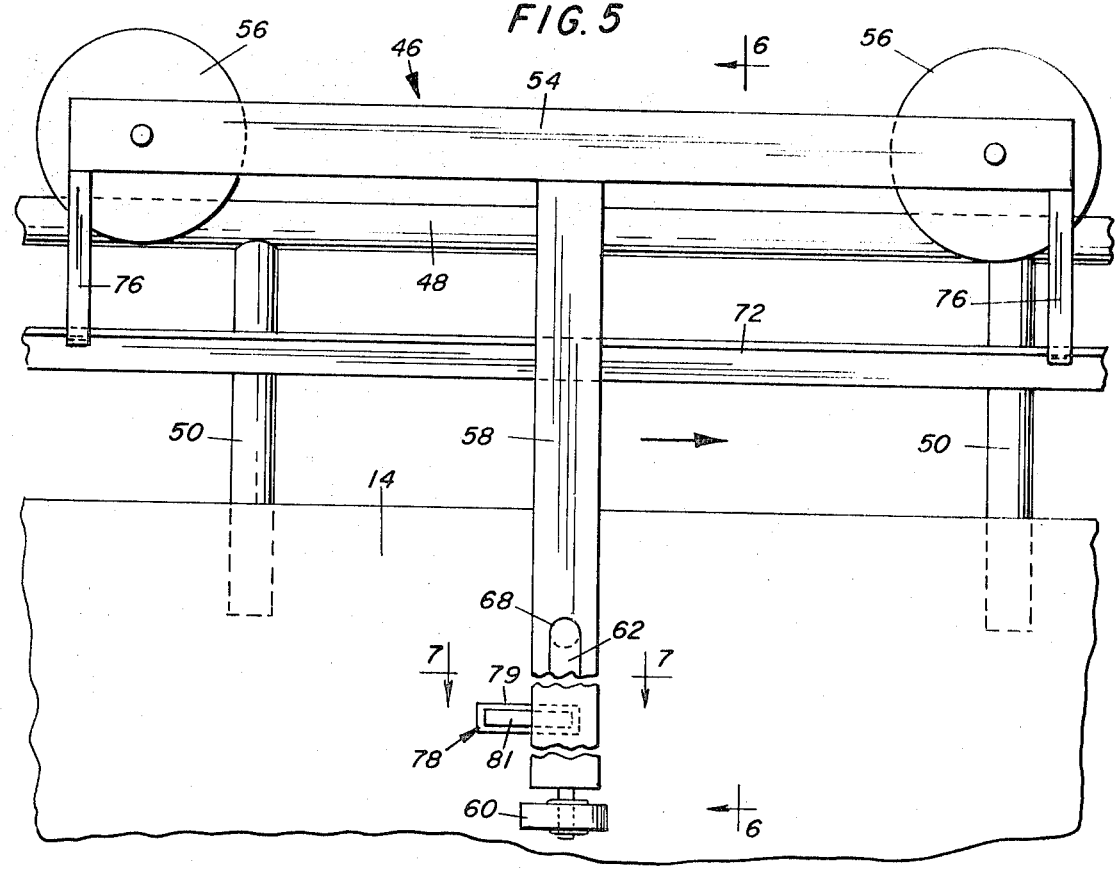
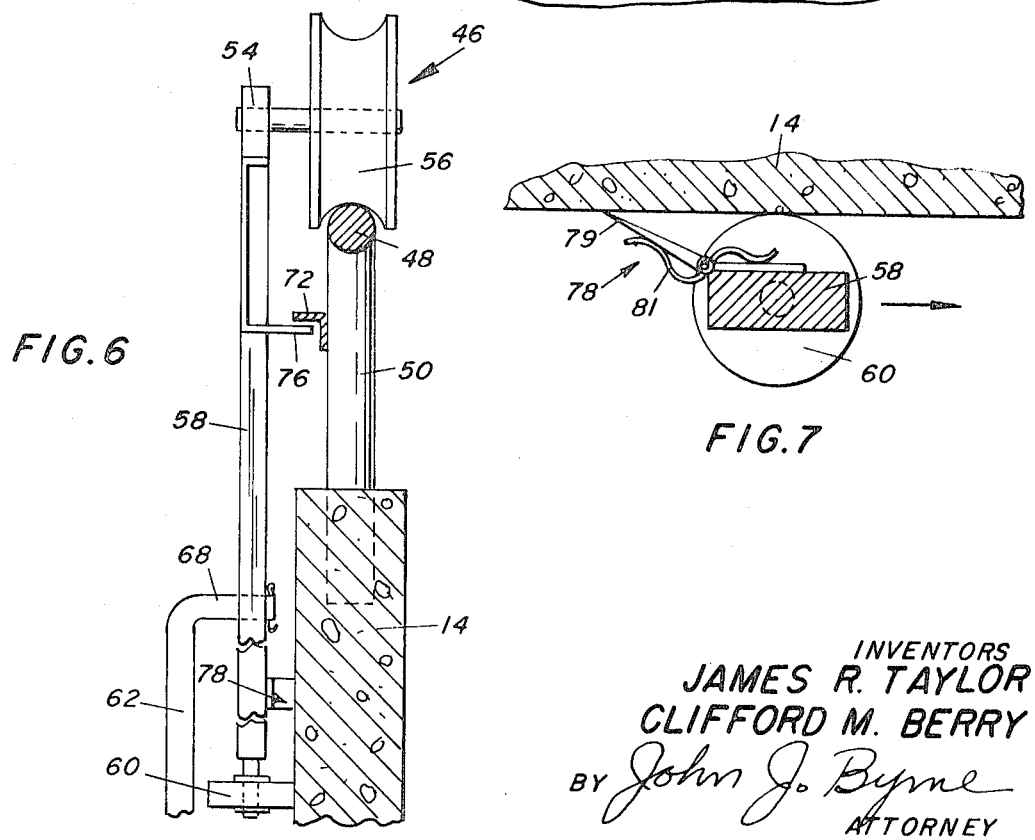

ANIMAL ACTUATED SILO FEEDING GATE

This invention relates to a feeding silo and more particularly to a feeding silo of the type having a feeding gate or yoke which is mounted for movement inwardly through the silo and against the ensilage. The gate is moved inwardly against the ensilage by the weight of the feeding animals pressing against the gate at a rate dependent upon the rate of consumption of the ensilage by the animals.

It is known in the prior art to provide a horizontally disposed, self-feeding silo having movable feeding gates or yokes, movable longitudinally of the silo against the ensilage by the weight of the feeding animals. One of the major problems encountered in such known silos is that the gates or yokes have a tendency to bind due to frictional contact between the edges of the gate and the sidewalls and floor of the silo. In some constructions which include movable feeding gates suspended from rollers movable along the top edges of the sidewalls of the silo, there is a tendency for the gate to cant or swing about a vertical axis due to lateral shifting of the rollers, thereby hampering further inward movement of the gate.

Another problem of prior art is that the movable gates are not restricted from vertical dislodgement from its supporting structure. In some instances, it is possible for the cattle or other feeding animal to raise and move past the gate.

It is an object of this invention to provide a horizontal feeding silo having movable feeding gate or yoke whereby antifriction means are provided to facilitate the movement of the gate through the silo behind the force of the feeding animals.

It is another object of this invention to provide suspension means for the movable gate including means to minimize the swinging or canting of the gate about a vertical axis, thereby facilitating the movement of the gate.

It is another object of this invention to provide means to prohibit substantial vertical displacement of either the suspension means or the movable door.

It is another object of this invention to provide a feeding silo having substantial versatility.

It is another object of this invention to provide a signal which is periodically actuated to indicate to the animals that it is feeding time.

Specifically, the feeding silo of this invention comprises an enclosure having opposed upright sidewalls and at least one open end. The feeding gate extends across the open end and is mounted for movement from said open end, longitudinally through the enclosure at a rate dependent upon the rate of ensilage consumption. The gate is mounted for movement by suspension means comprising rails and guide means attached to each of said sidewalls and extending longitudinally of the enclosure in parallel relationship. A carriage rides on each of said rails and engages said guide means and includes two flanged wheels mounted in tandem relationship. A balancing arm depends downwardly from each of the carriages from a point intermediate the tandem wheels and is provided with a roller at its lower end which rolls along the inner surface of the sidewall as the gate is pushed inwardly through said enclosure. A scraper is provided on the lower leading edge of the gate and includes ground engaging rollers which help support the scraper and facilitate the movement of the gate through the enclosure. The gate comprises upper and lower horizontal rods spanned by vertical rods which are laterally adjustable along the length of the horizontal rods to vary the gaps therebetween such that the gate can be adjusted for feeding animals of different sizes. Stop means are attached to the gate to prevent rearward movement thereof.

These and other objects of the invention will become more apparent to those skilled in the art by reference to the following detailed description when viewed in light of the accompanying drawings wherein:

FIG. 1 is a diagrammatic view of the feeding silo of this invention;

FIG. 2 is a front view of the feeding silo of this invention;

FIG. 3 is a cross-sectional view taken along line 3—3 of FIG. 2;

FIG. 4 is a cross-sectional view taken along lines 4—4 of FIG. 2;

FIG. 5 is a fragmentary view taken along lines 5—5 of FIG. 2;

FIG. 6 is a cross-sectional view taken along lines 6—6 of FIG. 5; and

FIG. 7 is a cross-sectional view taken along lines 7—7 of FIG. 5.

Referring now to the drawings wherein like numerals indicate like parts, 10 indicates generally the feeding silo of this invention which includes an enclosure 12 of concrete or other suitable material having opposed upright sidewalls 14 and 16 and a floor 18. Said enclosure includes a rear wall 20 and is open at the other end. It is to be understood that the walls 14, 16 and 20 can be positioned directly on the ground as opposed to having a floor or supporting base 18. A feeding gate or yoke 22 is positioned across the open end of the enclosure and is mounted for movement longitudinally of the enclosure 12 towards the rear wall 20. The silo in use is shown diagrammatically in FIG. 1.

As best seen in FIG. 1, the gate includes an upper horizontal bar 24 and a lower horizontal bar 26, the latter terminating in upturned end bars 28 and 30. Intermediate the end bars and spanning the distance between the upper and lower horizontal bars are vertical bars 32 each having U-shaped clamps 34 fixedly attached to each end thereof as best shown in FIG. 3. The vertical bars are attached to the horizontal bars by means of the U-shaped clamps 34 and are tightened into fixed position by bolts 36. By such means, the vertical bars are laterally adjustable relative to the horizontal bars to vary the size of the gaps between the bars. For example, it may be desirable to have approximately a 14-inch gap for receiving the heads of feeding animals such as full-grown cattle. However, calves might be able to walk through a gate having gaps 14 inches in width; therefore, it may be desirable to adjust the gaps down to 8 inches for example. This can be done merely by adding one or two more vertical bars and shifting the other bars.

Positioned along the lower leading edge of the gate is a scraper 38 inclined to be horizontal and provided with a removable tip 40. The scraper is partially supported by ground-engaging roller 42 as best seen in FIG. 4. As many rollers as is necessary can be used although three equispaced rollers are preferred. The scraper is attached to the lower horizontal bar by spaced U-clamps 44 which are fixedly attached to the scraper 38.

The yoke 22 is mounted for movement through the enclosure by suspension means generally indicated by the numeral 46, which means includes rails 48 which are attached to the sidewalls 14 and 16 of the enclosure 12 and extend longitudinally thereof in parallel relationship. The rails as shown on tubular and cross section, however, it is to be understood that rails of other cross-sectional shapes can be employed. The rails are shown attached to the enclosure by means of vertical supports 50 which are embedded in the concrete sidewalls. However, the rails can be mounted directly onto the upper surfaces of the sidewalls.

Identical carriages 52 are mounted for movement along the rails. As shown in FIG. 5, each carriage includes a longitudinal support beam 54 and flanged wheels 56 journaled to the support beam 54 in tandem relationship. The flanges on the wheels, of course, prevent relative lateral movement between the wheels and rails and minimize possibilities of the wheels becoming displaced from the rails. Support and balancing arm 58 is attached to and depends from the beam 54 and is provided with a roller 60 at its lower end, which roller rides along the inner surfaces of the sidewalls 14 and 16. The purpose of the balancing arm is to help maintain the carriage in substantially upright and vertical disposition relative to the sidewalls of the enclosure and to the roller to facilitate movement of the gate through the enclosure by the provision of two flange rollers on each carriage in tandem spaced relationship, the possibility of canting or swinging movement of the carriage and thereby the gate about a vertical axis is substantially minimized. It is to be understood that the gate provides a substantially rigid connection between the two carriages.

The balancing arm 58 also serves as a connecting means between the gate and the carriage. The end bars 28 and 30 of the gate 22 are provided with upper extensions 62 and 64, each of which have outwardly turned projections 66 and 68 which are pivotally received in apertures in the support arms 58 whereby the gate is mounted for pivotal motion about a horizontal axis relative to the carriages and arms 58. Some pivotal movement is desirable to prevent binding. Exaggerated pivotal movement is prevented by the ensilage on one side and the stop means, which will be discussed below, on the other.

Guide rails 70 are provided below each wall 48 and comprises an inwardly extending horizontal flange 72, as best seen in FIG. 6, which is engaged by the outwardly turned projection 74 of each safety arm 76. A safety arm 76 is mounted on each end of the beam 54. The primary purpose of the guide rail is to prevent vertical displacement of the carriage relative to the main rails 48 but they also assist in preventing lateral or swinging movement.

Stop means 78 are provided on each of the balancing arms 58 and comprise an inwardly spring biased lever 79 which rides along the surfaces of the sidewalls of the enclosure and prevents rearward movement of the feeding gate by means of frictional wedging contact with the sidewalls when rearward pressure is applied to the gate. To enhance the frictional gripping action, a rubber coating or tip can be applied to the end of the lever 79. When it is desired to move the gate rearwardly, the detents or stop means 78 must be held out of contact with the sidewalls against the biasing force exerted by the metal spring 81.

The feeding silo has an electronically timed animal caller 76, which is controlled by a solid-state system for periodically calling animals to feed the caller, can be in the form of a horn or other suitable signaling device with which the animals come to associate feeding time.

In operation, the feeding animals place their heads through the gaps in the feeding gate 22 to feed and while feeding they press against the gate causing it to move inwardly at a rate commensurate with the rate of consumption of the ensilage within the enclosure 12. The antifriction rollers below the scraper and at the lower end of the arms 54 greatly facilitate the movement of the gate through the enclosure.

In a general manner, while there has been disclosed an effective and efficient embodiment of the invention, it should be well understood that the invention is not limited to such an embodiment as there might be changes made in the arrangement, disposition, and form of the parts without departing from the principle of the present invention as comprehended within the scope of the accompanying claims.

I claim:

1. A feeding silo containing ensilage, comprising an enclosure having opposed upright sidewalls and at least one open end, a feed gate positioned across said open end, suspension means mounting said gate for movement longitudinally through said silo from said open end, said suspension means comprising a rail attached to each of said sidewalls, a wheeled carriage riding on each of said rails, means connecting said gate to said carriage, and a balance arm attached at one end to and depending from each of said carriages and a horizontally disposed roller on the other end of said arm maintained in rolling engagement with each of said sidewalls.

2. A feeding silo as defined in claim 1 wherein said carriages each include front and rear flanged wheels, in tandem relationship and said balancing arms depend from a point on each of said carriages intermediate the axes of said wheels.

3. A feeding silo as defined in claim 2 wherein said gate is pivotally attached to said balancing arms.

4. A feeding silo as defined in claim 1 and including a scraper mounted on the leading bottom edge of said gate and a grounding-engaging roller attached to said scraper for facilitating the movement of said scraper and said gate.

5. A feeding silo as defined in claim 1 and including stop means on said carriage for preventing rearward movement thereof.

* * * * *